Figure 1:
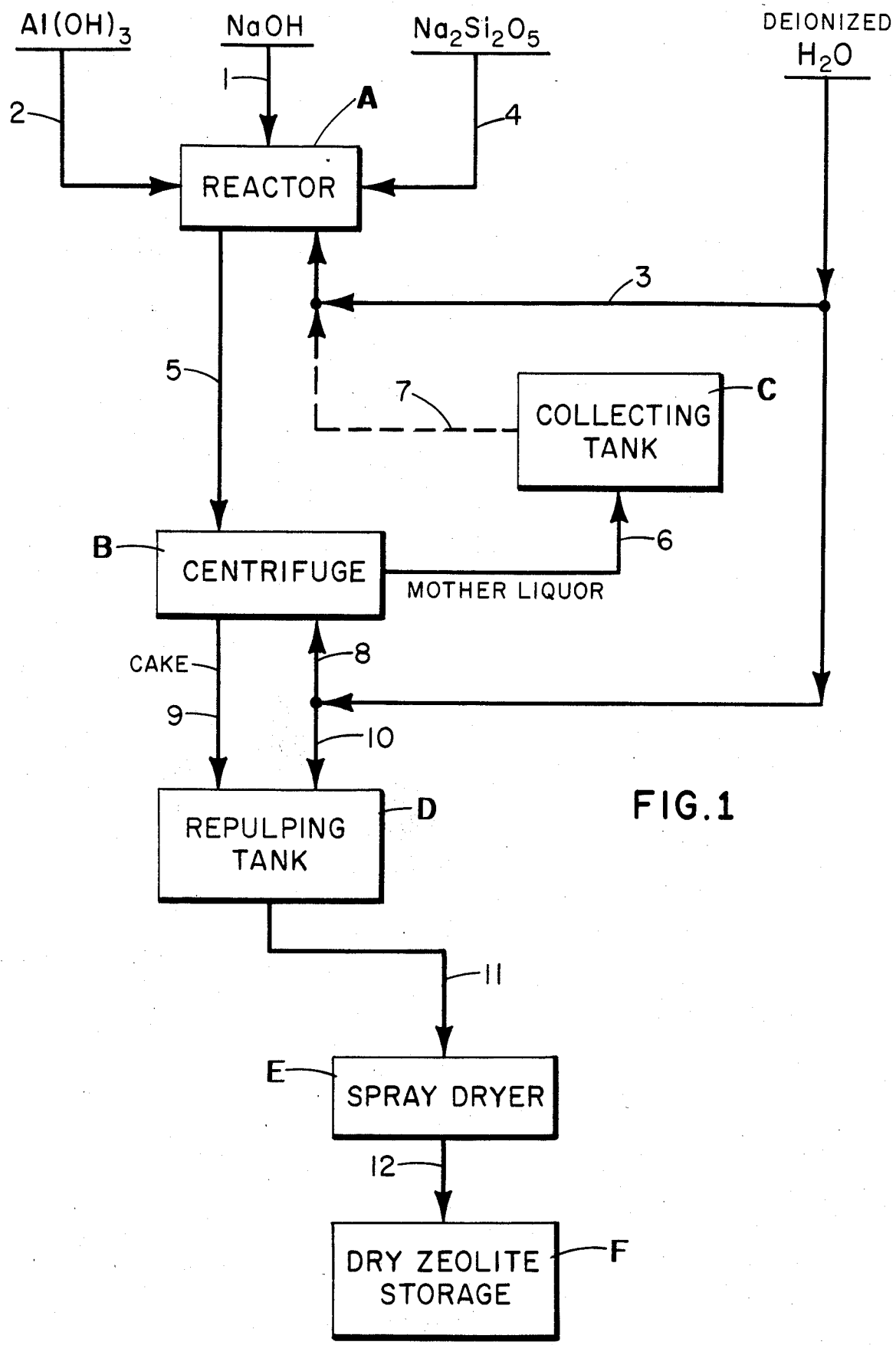

United States Patent [19]

Pastorello et al.

[11] Patent Number: 4,649,036
[45] Date of Patent: Mar. 10, 1987

[54] PROCESS FOR THE MANUFACTURE OF ZEOLITES 4A HAVING A HIGH CRYSTALLINITY AND A FINE GRANULOMETRY AND BEING PARTICULARLY SUITABLE FOR THE FORMULATION OF DETERGENT COMPOSITIONS

[75] Inventors: Fabio Pastorello; Claudio Troglia, both of Milan, Italy

[73] Assignee: Montedison S.p.A., Milan, Italy

[21] Appl. No.: 845,495

[22] Filed: Mar. 31, 1986

Related U.S. Application Data

[63] Continuation of Ser. No. 664,093, Oct. 24, 1984, abandoned, which is a continuation of Ser. No. 595,643, Apr. 2, 1984, abandoned, which is a continuation of Ser. No. 285,927, Jul. 23, 1981, abandoned, which is a continuation of Ser. No. 116,255, Jan. 28, 1980, abandoned.

[30] Foreign Application Priority Data

Jan. 26, 1979 [IT] Italy .............................. 19617 A/79

[51] Int. Cl.$^4$ .............................................. C01B 33/28
[52] U.S. Cl. ................................. 423/328; 423/329; 502/60
[58] Field of Search ................. 423/328, 329; 502/60

[56] References Cited

U.S. PATENT DOCUMENTS 3,058,805 10/1962 Weber ................................. 423/329
3,985,669 10/1976 Krummel et al. .................... 423/328
4,041,135 8/1977 Williams et al. ..................... 423/329
4,071,377 1/1978 Schwuger et al. .............. 423/329 X
4,150,100 4/1979 Kettinger et al. ................... 423/329
4,263,266 4/1981 Michel et al. ........................ 423/329
4,274,975 6/1981 Corkill et al. ................... 423/328 X
4,310,496 1/1982 Achenbach et al. ................ 423/118

FOREIGN PATENT DOCUMENTS 2824342 12/1978 Fed. Rep. of Germany ...... 423/329
1232429 5/1971 United Kingdom ............... 423/328

Primary Examiner—John Doll
Assistant Examiner—Jackson Leeds
Attorney, Agent, or Firm—Stevens, Davis, Miller & Mosher

[57] ABSTRACT

The synthesis of zeolites 4A having a high crystallinity and a fine granulometry is disclosed, by the addition in a first stage of a sodium silicate solution to a sodium aluminate solution (containing an excess of NaOH and heated to a temperature of from 50° to 100° C.), and by the crystallization in a second stage at a temperature of from 70° to 105° C., characterized in that the temperature of the sodium silicate solution is lower by at least twenty Centigrade degrees than that of the sodium aluminate solution, the molar ratios $SiO_2:H_2O$ and $SiO_2:Na_2O$ in the sodium silicate solution being respectively from 0.030 to 0.150 and from 1.95 to 2.30, and the weight ratio between the reaction mother liquor and the zeolite thus formed being from 6.5 to 20.

3 Claims, 4 Drawing Figures

PROCESS FOR THE MANUFACTURE OF ZEOLITES 4A HAVING A HIGH CRYSTALLINITY AND A FINE GRANULOMETRY AND BEING PARTICULARLY SUITABLE FOR THE FORMULATION OF DETERGENT COMPOSITIONS

This application is a continuation of application Ser. No. 664,093, filed Oct. 24, 1984 which in turn is a continuation of application Ser. No. 595,643 filed Apr. 2, 1984, which in turn is a continuation of application Ser. No. 285,927 filed July 23, 1981 which in turn is a continuation of application Ser. No. 116,255 filed Jan. 28, 1980, all of which are now abandoned.

This invention relates to a process for the manufacture of zeolites 4A having a high degree of crystallinity and a fine granulometry, and particularly suitable for the formulation of detergent compositions.

Belgian Pat. No. 860,757 describes preparing zeolites of this type by adding to a hot (70° C.) solution of a particular sodium silicate, a hot (70° C.) solution of sodium aluminate containing an excess of NaOH. The silicate solution is prepared by mixing together, under stirring, an aqueous water-glass solution, in which the molar ratio $SiO_2:Na_2O$ is 3.46, with an aqueous solution of NaOH, whereby the molar ratio drops to 1.65. French Pat. No. 2,096,360, on the contrary, describes pouring the hot silicate solution into the hot aluminate solution, previously placed into a reactor, while another Belgian Patent (No. 862,740) describes mixing the two solutions both at low temperature. According to these patents it is possible to obtain particles with a high degree of crystallinity and fine granulometry; however, the statistical particle size distribution is not fully satisfactory. In fact it is known that for the purposes of detergency, the zeolite particles must show a granulometric distribution completely between 1 and 10 μm. The particles above 10 μm display slow exchange kinetics with calcium and especially with magnesium, leave residues on the fabrics, and clog the discharge pipes; particles below 1 μm penetrate deeply into the mesh of the fabrics, thereby causing a progressive matting of the same, and require too long a settling time in the ecological vats for the treatment of waste water. Experience teaches that best results, in the way of good detergency without ecological problems, are reached only when the granulometric modulation index is sufficiently high and the coarse fraction is negligible. By the term "granulometric modulation index" ($\omega$) is to be understood the percentage by weight of particles the size of which is from 3 to 8 μm, when the granulometric analysis is carried out with a Coulter Counter, as indicated in the Belgian Pat. No. 860,757. By the term "coarse fraction" ($\alpha$) is to be understood the percentage by weight of particles with a size greater than 10 μm (Coulter Counter analysis). Another drawback of the prior art process is the complexity and the slow rate of the reaction.

Thus, one object of the present invention is that of providing a simpler, faster, and more flexible process that will lead to a product of the same or even superior quality, and more particularly to a product that will have a greater softening power on waters made hard by the presence of magnesium ions. Still other objects will become evident in the following description.

In its more general form, this invention provides a process for the manufacture of zeolites 4A, having a high degree of crystallinity and a fine granulometry, by the addition, in a first stage, of an aqueous sodium silicate solution to an aqueous sodium aluminate solution, containing an excess of NaOH and preheated to a temperature from 50° to 100° C., and by the crystallization, in a second stage, at a temperature from 70° to 105° C., characterized in that the temperature of the sodium silicate solution is lower by at least twenty Centrigrade degrees than that of the sodium aluminate solution, the molar ratios $SiO_2:H_2O$ and $SiO_2:Na_2O$ in the sodium silicate solution being respectively from 0.030 to 0.150 and from 1.95 to 2.30, and the weight ratio ($\tau$) between the reaction mother liquor and the zeolite thus formed (understood as containing 22% by weight of water of crystallization) being from 6.5 to 20, but preferably from 8 to 15.

The ratio ($\tau$) may be defined in a precise way by the equation:

$$\tau = \frac{g\ Na_2O + g\ Al_2O_3 + g\ SiO_2 + g\ H_2O - g\ SiO_2/0.3288}{g\ SiO_2/0.3288}$$

wherein the symbols g $Na_2O$, g $Al_2O_3$, etc., represent the quantities in grams of the fed-in reactants.

By the process of this invention it is possible to obtain zeolites 4A with a high degree of crystallinity and a fine granulometry, having a granulometric modulation index ($\omega$) equal to or greater than 85 and a coarse fraction ($\alpha$) equal to or less than 1 (even down to zero).

The products obtained by the process according to the invention have a very high exchange power, even with respect to waters made hard by the presence of magnesium ions. The exchange with magnesium can in fact attain (in equivalent terms) the level of 45 mg CaO/g (and even 50, in some cases), measured according to the method described below.

This invention becomes even more significant if one considers that water-glass in which the molar ratio $SiO_2:Na_2O$ is about 3.46 (a product used in most of the other synthesis processes) is prepared by heating in a smelting furnace a mixture of siliceous sand and sodium carbonate, with a waste of energy, while the sodium disilicate ($Na_2Si_2O_5$) and the other silicates, according to the present invention are obtainable in a much less complex way, i.e., directly in solution, by the hot digestion of the silica in a solution of NaOH.

The rate of formation of the desired zeolite is very fast and the process shows quite a high degree of flexibility with regard to the operative conditions such as temperature and time, a flexibility that in general is not obtained with processes involving too high $SiO_2:Na_2O$ ratios.

Zeolites obtained according to the present invention have been tested in some of the formulations described in Belgian Pat. No. 860,757, Italian Pat. No. 1,009,446, and U.S. Pat. No. 4,083,793, always obtaining excellent results.

There are various possible ways of carrying out the invention. Thus, for instance, it is convenient that the silicate solution be added within a time equal to or below 15 minutes and that the temperature of the mixture during the first stage of the synthesis be maintained equal to that of the sodium aluminate solution, this latter being preferably between 70° and 75° C. Moreover, it is also convenient to subdivide the second stage into 3 sub-stages, the first sub-stage being characterized by a temperature equal to the temperature of the first stage, the second by a temperature rising from 70° to 105° C., and the third by a constant temperature between 95° and 105° C.

The time of the sub-stages is respectively between 30 and 60 minutes (preferably between 40 and 50) for the first, between 10 and 80 minutes (preferably between 15 and 40) for the second, and between 10 and 90 minutes (preferably between 15 and 60) for the third.

For making the reaction mixture homogeneous a bland or mild stirring is sufficient.

The reaction slurry may be conveniently filtered to centrifuged in order to obtain the separation of the microcrystals, and the mother liquor, after separation, may be discharged or recycled for the preparation of the sodium aluminate solution.

Still another variant consists in preparing, separately, a new sodium aluminate charge while the reactor is in operation.

The process may be conducted either in a continuous or in batch manner.

The invention is further illustrated in conjunction with the accompanying drawings provided for illustrative purposes only.

Figure 2:
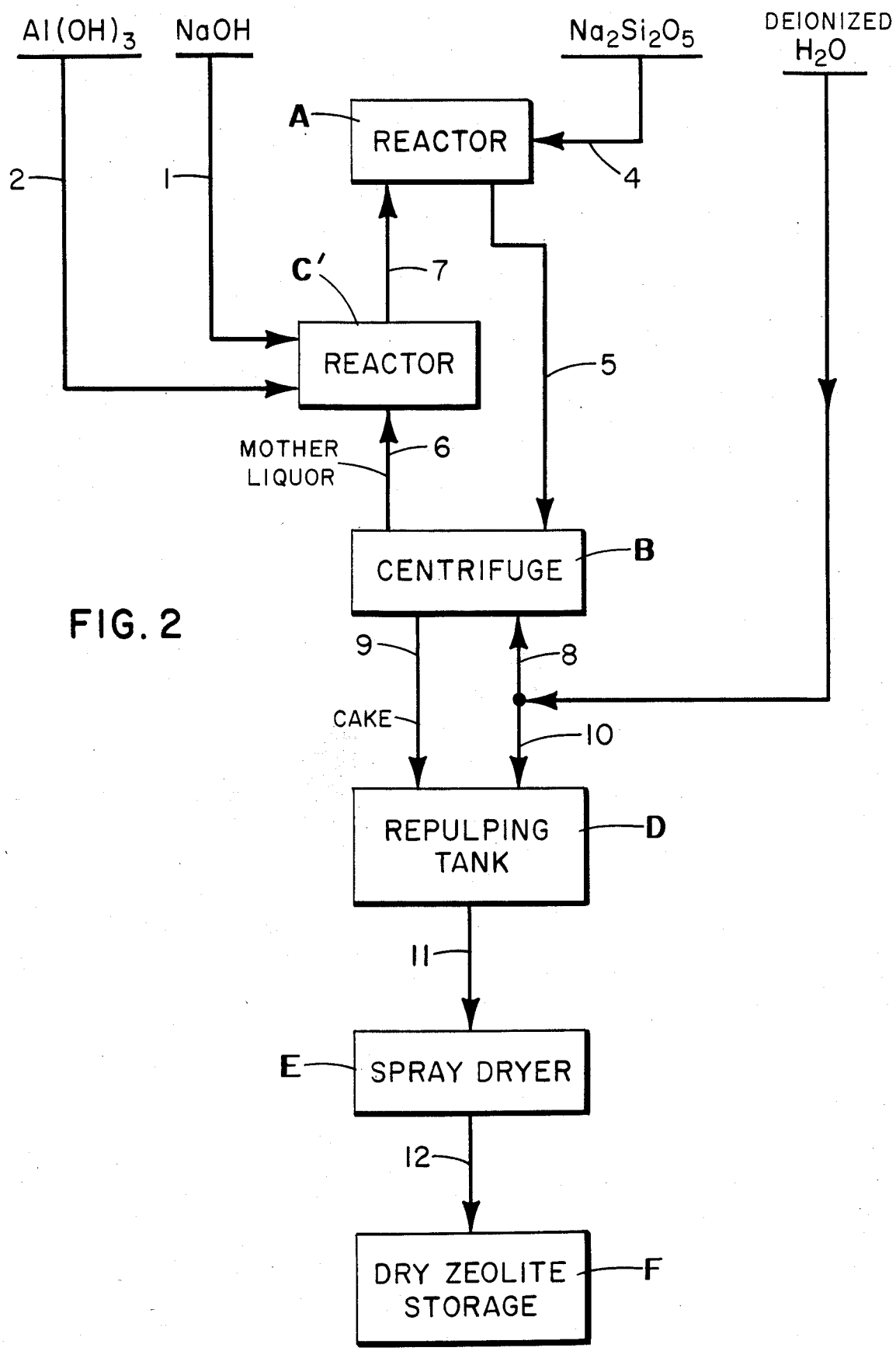
Figure 3:
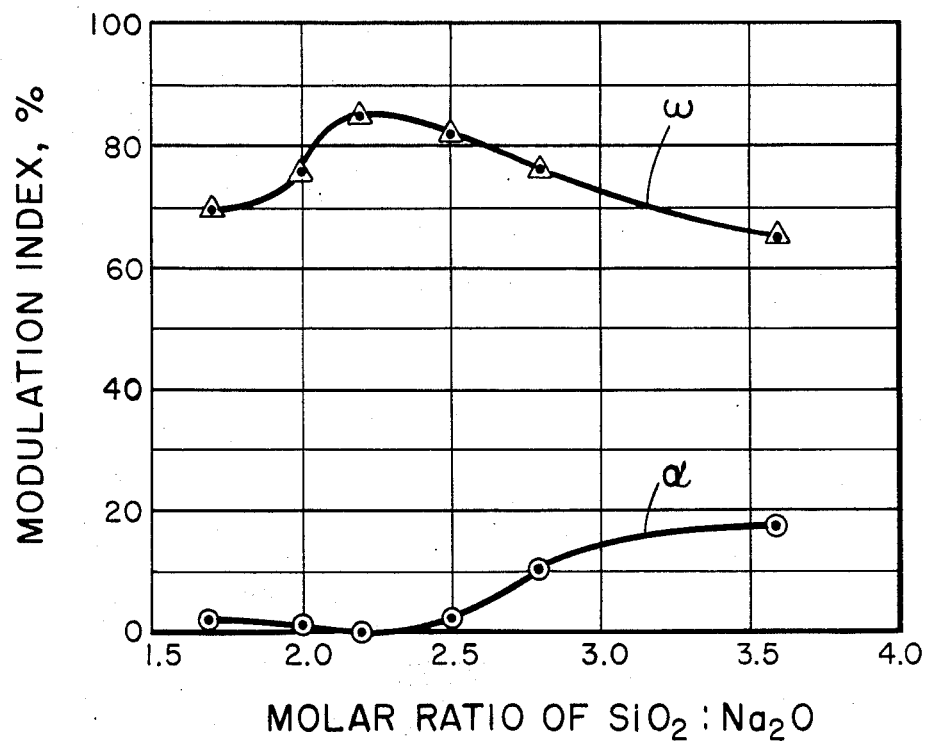
Figure 4:
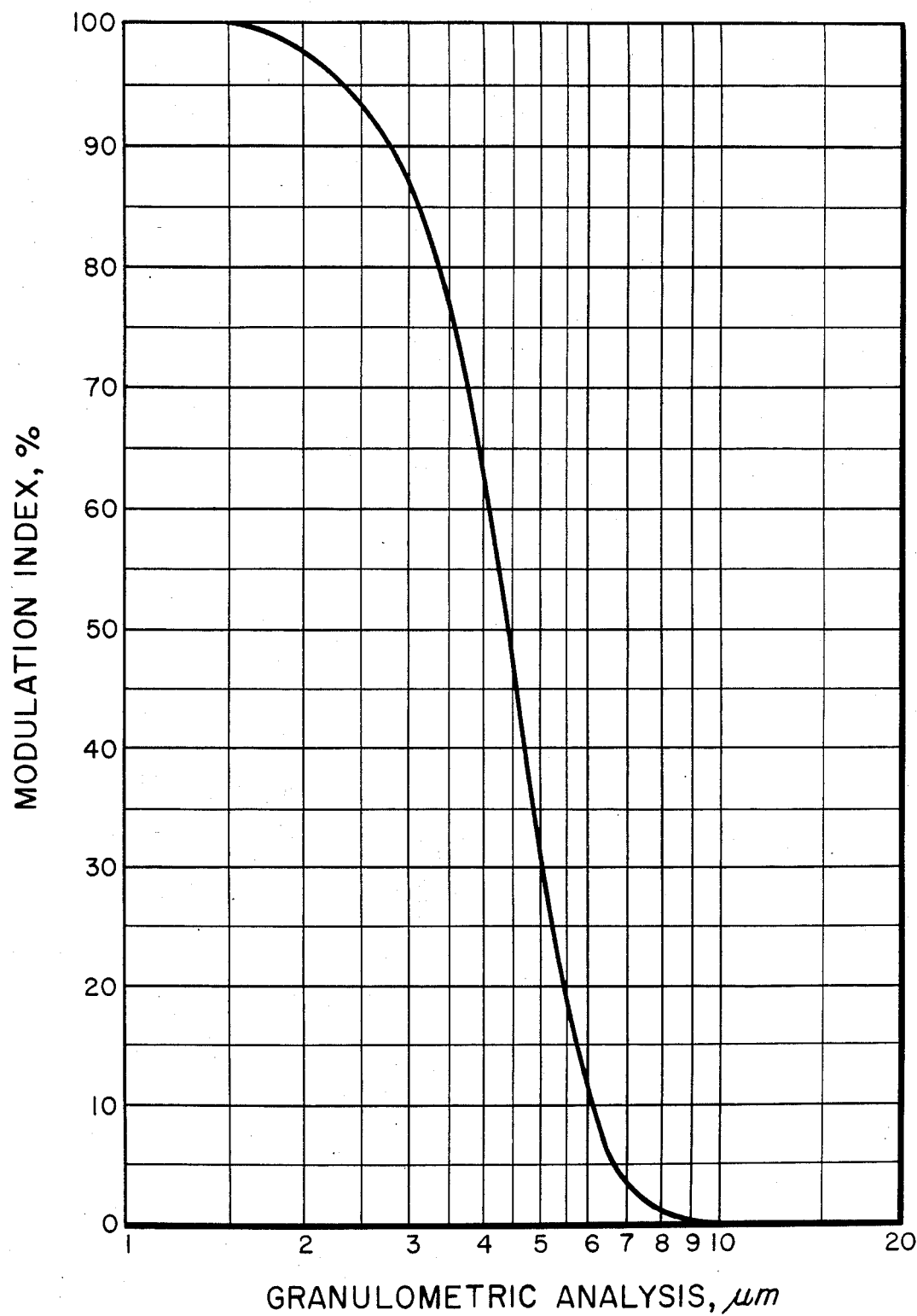

FIG. 1 illustrates a batch process, and
FIG. 2 represents a variant of FIG. 1, while
the remaining two FIGS. 3 and 4 are two graphs representing the most significant results obtainable from this invention.

According to FIG. 1, into a reactor A are introduced, in the given order (lines 1, 2 and 3) NaOH, alumina and deionized water. The resulting sodium aluminate solution is thereupon made to react with a solution of sodium disilicate 4 in A and the reaction mixture 5 is then separated by centrifugation in B from the mother liquor 6 which is then conveyed into the collecting tank C. When the soda-rich mother liquor is re-cycled in partial substitution for the deionized water and the NaOH, it is fed into reactor A through line 7. The centrifuged micro crystals are washed with de-ionized water (line 8) and then conveyed into tank D where the cake 9 is repulped with further de-ionized water (line 10). The resulting slurry 11 is then conveyed into a spray dryer E and the resulting dry zeolite 12 is stored in F. In the case of dryers of a different type, i.e., other than a spray dryer, cake 9 is conveyed directly to dryer E and then to storage F.

The meaning of the remaining figures is readily deducible from the following examples that illustrate the invention without however limiting in any way of scope of the same.

EXAMPLE 1

Into a stainless steel reactor [reactor A in FIG. 1], having a holding capacity of 1200 liters, provided with a thermostatically controlled heating system and a reflux condenser and a stirrer revolving at about 120 rpm, were introduced 239 kg of an aqueous solution of NaOH containing 34.3% by weight of $Na_2O$, 67 kg of hydrated aluminum oxide, at 60% by weight of $Al_2O_3$, and 585 kg of deionized water.

This reacton mixture was maintained at 100° C., for about 1 hour until a clear sodium aluminate solution was obtaned whose molar ratio $Na_2O:Al_2O_3$ is 3.35, and in which the percentage of $Na_2O$ is 9.2% by weight.

This solution was cooled to 70° C., and during 13 minutes it was fed, under stirring, with 209 kg of a second aqueous solution at 7° C., containing 8.7% by weight of $Na_2O$ and 18.4% by weight of $SiO_2$. The molar ratio $SiO_2:Na_2O$ is 2.2, a value that is near that of the stoichiometric composition of the disilicate ($Na_2Si_2O_5$). The quantities involved were such as to bring the weight ratios between the components of the reaction mixture to the values: $Na_2O:Al_2O_3=2.49$, $Na_2O:SiO_2=2.60$, $H_2O:SiO_2=23.94$.

Passing now to the second stage, that is, to the crystallization of the alumino-silicate, at first the mixture is maintained, in a first sub-stage, at 70° C. for 45 minutes, after which the temperature is slowly brought up from 70° to 100° C. within 15 minutes. At last, the mixture was heated for 90 minutes at 100° C., under atmospheric pressure and with mild stirring.

The resulting solid was separated from the mother liquor by means of a conventional basket-type centrifuge revolving about a vertical axis [centrifuge B in FIG. 1] and the resulting cake was then washed with deionized water until a pH value of 11.3 was attained in the wash waters.

An aqueous suspension containing 54 kg of zeolite per 100 liters of suspension was dried in a spray dryer [apparatus E in FIG. 1] thereby obtaining a crystalline 4A zeolite of the following composition: $1.01Na_2O.Al_2O_3.1.98SiO_2.4.51H_2O$.

The exchange power of this zeolite with calcium was determined according to the following method:

An aqueous 0.005 molar solution of tetrahydrated calcium nitrate, that is, having a hardness of 50 French degrees, was prepared by dissolving 1.181 g of $Ca(NO_3)_2.4H_2O$ in deionized $H_2O$ and then bringing the solution to a volume of 1 liter with more deionized $H_2O$. To this solution was then added 1 g of hydrated zeolite undergoing test and the ensuing suspension was subjected to vigorous stirring for 15 minutes by means of a magnetic stirrer, at a temperature of 22°±2° C. 100 $cm^3$ of this soluton were then filtered on a porous septum (degree of porosity=4) and its residual concentration of $Ca^{++}$ was determined by titration with the bisodium salt of centinormal (0.01 Normal) ethylenediaminetetraacetic acid (EDTA).

The exchange power of the hydrated zeolite was first calculated in mg of CaO per 1 g of zeolite, according to the following formula: $PS(Ca)=(50-cm^3\ EDTA)\times 5.6$, wherein by "$cm^3$ EDTA" is indicated the number of $cm^3$ of EDTA N/100 consumed in the titration and wherein by hydrated zeolite is meant a zeolite product in equilibrium with a relative atmospheric moisture not below 50% at room temperature (between 15° and 30° C.). The "hydrated" zeolite was obtained by placing the filtered and washed zeolite product into an oven for 5 hours at 105° C. The dried material was then ground in a mortar and then exposed to air for not less than 3 hours, under the above indicated temperature and humidity conditions. Then, by determining the moisture content of the hydrated zeolite by calcining at 800° C. for 1 hour, one goes back to the exchanging power per gram of "anhydrous" product. The values indicated on Tables I to V below refer to an "anhydrous" zeolite.

The exchanging power of the zeolite in respect of magnesium is determined in a similar way by using a 0.005 molar solution of $MgSO_4$ containing 1.232 g of $MgSO_4.7H_2O$ per liter. The exchanging power towards magnesium is calculated first in mg of CaO per gram of hydrated zeolite by means of the formula $PS(Mg)=(50-cm^3\ EDTA)\times 5.6$, and then one determines the exchanging power with reference to the "anhydrous" product (referred to Tables I to V) exactly as described above for calcium.

In order to evaluate the speed with which the exchange takes place, the tests were repeated with calcium and magnesium, by lowering the stirring time from b 15 to 2 minutes. The kinetics of the exchange is an important datum inasmuch as the sequestering action of the zeolite is exerted in the conventional washing machines in a short stretch of time of just a few minutes. The high exchanging power in the presence of magnesium-containing waters, as reported on Table I, represents a significant step forward in the art with respect to results obtained heretofore.

The granulometric analysis (on Coulter Counter) yielded the results recorded on Table I and reported also in FIGS. 3 and 4.

The diffractometric X-ray analysis showed a pure crystalline 4A zeolite. Below are reported the interplanary distances with the corresponding indexes and intensities for the diffractogrammic peaks:

| hkl | d (Å) | I/Io | hkl | d (Å) | I/Io |
|-----|-------|------|-----|-------|------|
| 100 | 12.29 | 100  | 221.3 | 4.11 | 36.5 |
| 110 | 8.71  | 69.5 | 311 | 3.714 | 53   |
| 111 | 7.11  | 34.5 | 320 | 3.417 | 16.5 |
| 210 | 5.51  | 25.5 | 321 | 3.293 | 46.5 |
| 211 | 5.03  | 2    | 410 | 2.988 | 55.5 |
| 220 | 4.36  | 6    |     |       |      |

EXAMPLE 2

Referring to FIG. 2, into a reactor C' identical to reactor A of FIG. 2 and which is similar to the reactor A of Example 1, were fed in 898 kg of a recycle of mother liquor 6 consisting of a solution containing 7.99% by weight of $Na_2O$ and 0.85% by weight of $Al_2O_3$. To this solution were then added under stirring (lines 1 and 2), 30 kg of a 34.3% by weight solution of $Na_2O$ and 55 kg of hydrated aluminum oxide at 60.87% of $Al_2O_3$.

The solution was then cooled down to 70° C. and transferred into reactor A. Into the reactor A were then fed, in 15 minutes and under stirring, 155 kg of an aqueous solution of sodium silicate at 10° C., containing 11.74% by weight of $Na_2O$ and 24.82% by weight of $SiO_2$ (molar ratio $SiO_2:Na_2O=2.18$). The ponderal or weight ratios between the components of the mixture corresponded to the following value: $Na_2O:Al_2O_3=2.44$; $Na_2O:SiO_2=2.61$; $H_2O:SiO_2=24.36$.

Thereupon followed crystallization, centrifugation, and drying, just as in Example 1 (see Table V).

EXAMPLE 3 (A Comparison Example)

Into the reactor A indicated in Example 1 were loaded 307 kg of a solution containing 29% by weight of $Na_2O$, 67.2 kg of hydrated aluminum oxide at 60.38% of $Al_2O_3$, and 591.5 kg of deionized water.

The temperature was kept at 100° C. for about 1 hour, until a clear solution was obtained in which the molar ratio $Na_2O:Al_2O_3$ was 3.61 and in which the percentage of $Na_2O$ was 9.22% by weight.

The reaction mass was then cooled to 70° C. and into the reactor A were fed, in 15 minutes, under stirring, 134.3 kg of a water-glass solution at 8° C., containing 8.24% by weight of $Na_2O$ and 28.69% by weight of $SiO_2$, and in which the molar ratio $SiO_2:Na_2O$ was 3.6. The ratios between the components of the mixture are indicated below in Table I.

Then followed crystallization, centrifugation, and a drying as in Example 1, thereby obtaining poor results that are recorded in Table I below.

This proves that it is advisable to avoid too high $SiO_2/Na_2O$ ratios in the silicate solution.

In the X-ray spectrum, the peaks have a mean intensity that is lower by 10% in comparison with that of Example 1, and the presence of no other crystalline compounds could be noted.

EXAMPLE 4

Into the same reactor A of Example 1 were loaded 243.3 kg of a solution containing 35.3% by weight of $Na_2O$, 67.2 kg of hydrated aluminum oxide at 60.38% by weight of $Al_2O_3$, and 646.2 kg of deionized water. The reaction mixture was maintained for about 1 hour at 100° C. until a clear solution was obtained whose molar ratio of $Na_2O:Al_2O_3$ is 3.48 and in which the percentage of $Na_2O$ amounted to 8.98% by weight.

The reaction mixture was cooled to 70° C. and in 15 minutes, under stirring, there were admixed 143.3 kg of a sodium silicate solution at 8° C. containing 9.93% by weight of $Na_2O$ and 26.90% by weight of $SiO_2$, and in which the $SiO_2:Na_2O$ molar ratio was 2.8.

The ponderal or weight ratios of the components of the reaction mixture are recorded in Table I below.

Thereafter followed crystallization, centrifugation, and drying as in Example 1.

The results are recorded in Table I. These results, depending on a $SiO_2:Na_2O=2.8$ ratio which is lower than that of Example 3, are slightly better (with respect to Example 3), but are still below the excellent results in Example 1.

EXAMPLE 5: ($Na_2Si_2O_5$)

Into the reactor A of Example 1 were loaded 227.6 kg of a solution containing 35.05% by weight of $Na_2O$, 67.2 kg of hydrated aluminum oxide at 60.38% by weight of $Al_2O_3$, and 637.9 kg of deionized water. This mixture was maintained at a temperature of 100° C. for about 1 hour until a clear solution was obtained in which the $Na_2O:Al_2O_3$ molar ratio was 3.23 and in which the $Na_2O$ was 8.55% by weight.

Thereupon the reaction mass was cooled to 70° C. and in 15 minutes, under stirring, it was additioned with 167.4 kg of a sodium disilicate solution at 8° C., containing 34.9% by weight of sodium disilicate ($Na_2Si_2O_5$), in which the molar ratio $SiO_2:Na_2O$ was 2.

The ponderal or weight ratios between the components of the reaction mixture are recorded in Table I.

Thereupon followed crystallization, centrifugation, and drying as in Example 1, thereby obtaining the results indicated in Table I below.

EXAMPLE 6

Into the reactor A of Example 1 were loaded 218 kg of a solution containing 35.05% by weight of $Na_2O$, 67.2 kg of hydrated aluminum oxide at 60.38% by weight of $Al_2O_3$, and 636.6 kg of deionized water. This reaction mixture was maintained at 100° C. for about 1 hour until a clear solution was obtained in which the molar ratio $Na_2O:Al_2O_3$ is 3.11 and where the $Na_2O$ amounts to 8.31% by weight.

The reaction mixture was cooled to 70° C., and into the reactor were then fed during 15 minutes, under stirring, 177.5 kg of a sodium silicate solution at 8° C., containing 13.20% by weight of $Na_2O$ and 21.71% by weight of $SiO_2$, in which the molar ratio $SiO_2:Na_2O$ is 1.7.

The ponderal or weight ratios between the components of the reaction mixture are recorded in Table II.

Then followed crystallization, centrifugation, and drying as in Example 1, thereby obtaining the results indicated below in Table II.

EXAMPLE 7

In this instance Example 1 was repeated, leaving unchanged the global or overall composition of the reaction mixture (see Table II), but altering the composition of the starting solutions so that in the sodium silicate solution the ratio $SiO_2O:Na_2O$ is equal to 2.5.

The results are recorded below in Table II.

EXAMPLES 8 A Comparison Example) and 9

Example 1 was repeated, varying only the time of the addition of the sodium silicate to the sodium aluminate.

Instead of 13 minutes as in Example 1, it was 45 minutes in Example 8 and 5 minutes in Example 9.

The results are recorded below in Table II.

EXAMPLE 10

Into the reactor A of Example 1 were loaded 250 kg of a solution at 35% by weight of $Na_2O$, 71.5 kg of hydrated aluminum oxide at 63.2% by weight of $Al_2O_3$, and 633 kg of deionized water. The reaction mixture was heated at 100° C., until the hydrated aluminum oxide passed into solution.

This solution was then cooled to 70° C. and into it were fed, in 15 minutes and under stirring, 246 kg of an aqueous solution at 65° C., containing 17.1% by weight of $SiO_2$ and 8.83% by weight of $Na_2O$, according to a molar ratio $SiO_2:Na_2O=2$.

The ratios between the components of the reaction mixture are as indicated in Table III below, which also reports the results obtained after crystallization, centrifugation, and drying as in Example 1.

The high coarse fraction ($\alpha$), equal to 2% by weight of particles above 10 micrometers, is a sign of poor product (and any way less valuable in comparison with that of Example 1) and shows the necessity for maintaining the temperature of the sodium silicate solution below the reaction temperature.

EXAMPLE 11

Example 10 was repeated, changing only the temperature of the sodium silicate solution from 65° to 50° C. From Table III, which shows data and results, there will be perceived a clear improvement connected with the lowering of the temperature as indicated above.

The influence of temperature becomes even more evident if one compares the results of Example 10 (temperature=65° C.) with the excellent results of Example 1 (temperature=7° C.).

EXAMPLE 12

Example 10 was repeated, with the following variations:

(a) the temperature of the sodium silicate solution was lowered to 23° C.;

(b) after the addition of the sodium silicate to the sodium aluminate (first stage) there was carried out the crystallization (second stage), while maintaining the temperature at 70° C. for 45 minutes. Then the temperature was gradually brought from 70° to 100° C. in 60 minutes and it was maintained at 100° C. for 90 minutes.

From Table III it will be seen that, in spite of the low modulation index ($\omega$), the exchanging power is very high and that the coarse fraction ($\alpha$) is completely absent.

EXAMPLE 13

Example 10 was repeated, except for the following variations:

(a) the temperature of the sodium silicate solution was lowered to 23° C.;

(b) the sodium aluminate solution contained 90.8 kg of water more while the sodium silicate solution contained 90.8 kg less of water. In other words, the global or overall ratios between the components ($Na_2O$, $Al_2O_3$, $SiO_2$, $H_2O$) were kept unchanged but the procedure was started from a more concentrated sodium silicate solution in which the molar ratio $SiO_2:H_2O$ rose up to 0.138 (in Example 10 the ratio equals 0.069).

The results recorded in Table III show a satisfactory exchange power and an excellent modulation index with a coarse fraction ($\alpha=1$) at the limit of acceptability.

EXAMPLE 14

Example 10 was repeated, with the following variations:

(a) the temperature of the sodium silicate solution was lowered to 25° C.;

(b) the solution of sodium aluminate contained 103 kg more of water, while the sodium silicate solution contained 103 kg less of water, whereby the molar ratio $SiO_2:H_2O$, in the silicate solution rose to 0.159.

The very poor results (Table IV) show that a low concentration of silica in the feeding solution, is an indispensable condition for the synthesis of zeolites of high quality.

EXAMPLE 15

Example 14 was repeated, but bringing the temperature of the sodium silicate solution up to 65° C., whereby the viscosity drops to about one fourth of the starting value (to 25° C.). Instead of obtaining better and acceptable results, as was to be expected, there was encountered (Table IV) a power of exchange with calcium inferior to that of Example 14, and granulometric parameters almost as poor as those of the preceding examples.

This proves the criticality of the dilution of the sodium silicate solution and excludes the possibility that the poor results depend on phenomena purely bound to the viscosity of the solution itself.

EXAMPLE 16

Example 15 shows that the dilution of the sodium silicate solution is a critical and necessary factor. The present example shows that the dilution nevertheless is not also a "sufficient" factor, unless it is accompanied by $SiO_2:Na_2O$ ratios sufficiently low. To this purpose, a sodium aluminate solution, prepared with 276.6 kg of a 35% by weight solution of $Na_2O$, 71.5 kg of hydrated aluminum oxide at 63.2% by weight of $Al_2O_3$, and 640.4 kg of deionized $H_2O$, was heated up to 70° C. an to it were additioned, during 15 minutes and under stirring, 211.2 kg of a sodium silicate solution at 23° C., containing 19.9% by weight of $SiO_2$ and 5.9% by weight of $Na_2O$, the molar ratio $SiO_2:Na_2O$ amounting to 3.5.

This was then processed as in Example 1 and thus was obtained a definitely poor product that showed a high coarse fraction ($\alpha$)=4; (see Table IV).

EXAMPLE 17

Into a heat-insulated reactor with a holding capacity of 70 m$^3$, and fitted with a stirrer and an external heating (by means of a recycle pump and an exchanger), were introduced 12,320 kg of a 35.5% by weight solution of Na$_2$O, 3,680 kg of hydrated aluminum oxide at 61.3% by weight of Al$_2$O$_3$, and 17,120 kg of deionized H$_2$O. This reaction mixture was heated up to 100° C. until dissolution of the alumina took place.

Thereupon 14,620 kg of deionized H$_2$O were fed and the temperature dropped thus to 75° C. At this point there were fed, in 15 minutes and under stirring, 12,240 kg of an aqueous solution of sodium silicate containing 17.16% by weight of SiO$_2$ and 8.61% by weight of Na$_2$O, at 22° C.

The temperature was maintained for 45 minutes at 75° C. and was then gradually brought up in 60 minutes to 98° C. Thereupon the mixture was kept at 98° C. for 1 hour after which it was filtered, washed, and dried, the product thus obtained having the properties reported in Table IV.

EXAMPLE 18

Into the reactor described in Example 17 were introduced 12,700 kg of a solution at 35.5% by weight of Na$_2$O, 3.610 kg of hydrated aluminum oxide at 61.3% by weight of Al$_2$O$_3$, and 17,760 kg of deionized H$_2$O, and the whole mixture was heated up to 100° C., until the dissolution of the alumina took piece.

Then were fed 14,940 kg of deionized H$_2$O, in consequence whereof the temperature dropped to 75° C.

At this point there were fed, during 15 minutes, 11,500 kg of a silicate solution containing 18.40% by weight of SiO$_2$ and 8.70% by weight of Na$_2$O, at 23° C.

The temperature was maintained at 75° C. for a period of 45 minutes and was then gradually brought up to 98° C. in 20 minutes.

The reaction mixture was then left for 30 minutes at 98° C. after which it was filtered, and the product was then washed and dried.

The excellent results thus obtained are recorded in Table V.

EXAMPLE 19

Example 10 was repeated except for the following variations:

(a) the temperature of the sodium silicate solution was reduced to 22° C.;

(b) the solution of the sodium aluminate contained 150 kg less of H$_2$O while the silicate contained 150 kg more of H$_2$O, wherefore the degree of dilution of the sodium silicate solution reached a high level (in fact the molar ratio SiO$_2$:H$_2$O amounts to only 0.038).

The not altogether satisfactory results reported in Table V shows that if a too restrained dilution is detrimental for the purposes of this synthesis (Examples 13 and 14) it is also true that a dilution pushed too much forward must likewise be avoided. Thus, it is advisable to maintain the molar ratio SiO$_2$:H$_2$O in the sodium silicate solution within the limits indicated by the experimental practice, of course with due respect to the other critical parameters.

EXAMPLE 20

Into the reactor of Example 1 were loaded 255 kg of a solution containing 35.5% by weight of Na$_2$O, 72.8 kg of hydrated aluminum oxide at 63.12% by weight of Al$_2$O$_3$, and 740 kg of deionized water. The whole mixture was then heated up to 100° C. until complete dissolution.

The mixture was then cooled to 70° C. and then, in 15 minutes, it was additioned with 148 kg of a solution containing 28.76% by weight of SiO$_2$ and 14% by weight of Na$_2$O, corresponding to a molar ratio SiO$_2$:Na$_2$O=2.1, at 21° C. Other relevant data and results are reported in Table V.

TABLE I

| Characteristics | Ex. 1 | Ex. 3 | Ex. 4 | Ex. 5 |
|---|---|---|---|---|
| SiO$_2$:Na$_2$O in the silicate solution | 2.2 | 3.6 | 2.8 | 2.0 |
| mixing time (in minutes) | 13' | 15' | 15' | 15' |
| ratios in the: Na$_2$O:Al$_2$O$_3$ | 2.49 | 2.47 | 2.47 | 2.47 |
| reaction mix- Na$_2$O:SiO$_2$ | 2.60 | 2.60 | 2.60 | 2.59 |
| ture H$_2$O:SiO$_2$ | 23.94 | 23.89 | 23.89 | 23.91 |
| Power of exchange: | | | | |
| stirr. for 15 min. Ca$^{++}$ | 177 | 163 | 173 | 175 |
| stirr. for 15 min. Mg$^{++}$ | 45 | 29.5 | 28 | 45 |
| stirr. for 2 min. Ca$^{++}$ | 145 | 123 | 137 | 145.5 |
| stirr. for 2 min. Mg$^{++}$ | 16 | 13.5 | 14 | 24 |
| granulometry: | | | | |
| <2 μm | 2.5% | 1% | 1.5% | 3% |
| <3 μm | 13% | 4% | 8.5% | 21.5% |
| <5 μm | 68% | 26% | 50% | 89% |
| <8 μm | 98.5% | 69% | 85% | 98% |
| <10 μm | 100% | 83% | 90% | 99% |
| Coarse Fraction ($\alpha$) | 0 | 17 | 10 | 1 |
| Modulation ($\omega$) | 85.5 | 65 | 76.5 | 76.5 |

TABLE II

| Characteristics | Ex. 6 | Ex. 7 | Ex. 8 | Ex. 9 |
|---|---|---|---|---|
| SiO$_2$:Na$_2$O in the silicate solution | 1.7 | 2.5 | 2.2 | 2.2 |
| mixing time (in minutes) | 15' | 13' | 45' | 5' |
| Ratios in the: Na$_2$O:Al$_2$O$_3$ | 2.47 | 2.49 | 2.49 | 2.49 |
| reaction mix. Na$_2$O:SiO$_2$ | 2.60 | 2.60 | 2.60 | 2.60 |
| H$_2$O:SiO$_2$ | 23.90 | 23.94 | 23.94 | 23.94 |
| Exchange power: | | | | |
| stirr. 15 minutes Ca$^{++}$ | 175.5 | 175 | 166 | 172.5 |
| stirr. 15 minutes Mg$^{++}$ | 45.5 | 45 | 42.5 | 50 |
| stirr. 2 minutes Ca$^{++}$ | 148.5 | 145.5 | 140 | 152 |
| stirr. 2 minutes Mg$^{++}$ | 20.5 | 20.5 | 17 | 22.5 |
| granulometry: | | | | |
| <2 μm | 3% | 2% | 1% | 2.5% |
| <3 μm | 28% | 14% | 9% | 17% |
| <5 μm | 83% | 80% | 72% | 85% |
| <8 μm | 97.5% | 97% | 98% | 97% |
| <10 μm | 98.5% | 98% | 99% | 98% |
| Coarse fraction ($\alpha$) | 1.5 | 2 | 1 | 2 |
| Modulation ($\omega$) | 69.5 | 83 | 89 | 80 |

TABLE III

| Characteristics | Ex. 10 | Ex. 11 | Ex. 12 | Ex. 13 |
|---|---|---|---|---|
| SiO$_2$:Na$_2$O (silicate solut.) | 2.0 | 2.0 | 2.0 | 2.0 |
| SiO$_2$:H$_2$O (silicate solut.) | 0.069 | 0.069 | 0.069 | 0.138 |
| Temp. (silicate solut.) | 65° C. | 50° C. | 23° C. | 23° C. |
| Mixing time (in minutes) | 15' | 15' | 15' | 15' |
| Ratios in the: Na$_2$O:Al$_2$O$_3$ | 2.42 | see Example 10 | see Example 10 | see Example 10 |
| reaction mix- Na$_2$O:SiO$_2$ | 2.60 | | | |
| ture H$_2$O:SiO$_2$ | 23.87 | | | |
| Duration of second sub-stage | 15' | 15' | 60' | see Ex. 10 |
| Power of exchange: | | | | |
| stirr. for 15 min. Ca$^{++}$ | 170 | 175 | 175.5 | 172.5 |
| stirr. for 15 min. Mg$^{++}$ | 44 | 47 | 52 | 42 |
| stirr. for 2 min. Ca$^{++}$ | 132.5 | 137.5 | 158 | 129 |

TABLE III-continued

| Characteristics | Ex. 10 | Ex. 11 | Ex. 12 | Ex. 13 |
|---|---|---|---|---|
| stirr. for 2 min. $Mg^{++}$ | 3.5 | 3.5 | 23 | 3.5 |
| granulometry: | | | | |
| <2 μm | 2.5% | 4% | 4% | 0.5% |
| <3 μm | 16% | 16% | 28% | 6.5% |
| <5 μm | 71.5% | 87% | 92.5% | 41% |
| <8 μm | 96% | 97% | 99.5% | 94% |
| <10 μm | 98% | 98.5% | 100% | 99% |
| Coarse fraction (α) | 2 | 1.5 | 0 | 1 |
| Modulation (ω) | 80 | 81 | 71.5 | 87.5 |

TABLE IV

| Characteristics | Ex. 14 | Ex. 15 | Ex. 16 | Ex. 17 |
|---|---|---|---|---|
| $SiO_2:Na_2O$ (silicate solut.) | 2.0 | 2.0 | 3.5 | 2.1 |
| $SiO_2:H_2O$ (silicate solut.) | 0.159 | 0.159 | 0.080 | 0.069 |
| Temp. (silicate solut.) | 25° C. | 65° C. | 23° C. | 22° C. |
| Mixing time (in minutes) | 15' | 15' | 15' | 15' |
| Ratios in the: $Na_2O:Al_2O_3$ | see | see | 2.42 | 2.41 |
| reaction mix- $Na_2O:SiO_2$ | Example | Example | 2.60 | 2.58 |
| ture $H_2O:SiO_2$ | 10 | 10 | 23.87 | 23.90 |
| Duration of second sub-stage | see Ex. 10 | see Ex. 10 | see Ex. 10 | 60' |
| Power of exchange: | | | | |
| stirr. 15 minutes: $Ca^{++}$ | 170 | 168 | 174.5 | 175 |
| stirr. 15 minutes: $Mg^{++}$ | 21 | 38 | 42 | 51 |
| stirr. 2 minutes $Ca^{++}$ | 123.5 | 125.5 | 126 | 156 |
| stirr. 2 minutes $Mg^{++}$ | 0 | 0.5 | 14 | 20 |
| granulometry: | | | | |
| <2 μm | 1% | 1% | 1.5% | 3% |
| <3 μm | 4% | 3.5% | 15% | 28.5% |
| <5 μm | 25.5% | 23.5% | 74% | 91.5% |
| <8 μm | 68% | 71.5% | 94% | 99.0% |
| <10 μm | 86% | 89.5% | 96% | 100% |
| Coarse fraction (α) | 14 | 10.5 | 4 | 0 |
| Modulation (ω) | 64 | 68 | 79 | 70.5 |

TABLE V

| Characteristics | Ex. 18 | Ex. 19 | Ex. 20 | Ex. 2 |
|---|---|---|---|---|
| $SiO_2:Na_2O$ (silicate solut.) | 2.2 | 2.0 | 2.1 | 2.18 |
| $SiO_2:H_2O$ (silicate solut.) | 0.076 | 0.038 | 0.151 | 0.117 |
| Temp. (silicate solut.) | 23° C. | 22° C. | 21° C. | 10° C. |
| Mixing time (in minutes) | 15' | 15' | 15' | 15' |
| Ratios in the: $Na_2O:Al_2O_3$ | 2.49 | see | 2.42 | 2.44 |
| reaction mix- $Na_2O:SiO_2$ | 2.60 | Example | 2.61 | 2.61 |
| ture $H_2O:SiO_2$ | 23.95 | 10 | 23.87 | 24.36 |
| Duration of the second sub-stage | 20' | 15' | 60' | 15' |
| Power of exchange: | | | | |
| stirr. 15 minutes: $Ca^{++}$ | 176 | 167 | 174 | 176 |
| stirr. 15 minutes: $Mg^{++}$ | 46 | 31 | 41 | 43 |
| stirr. 2 minutes: $Ca^{++}$ | 142 | 121 | 147.5 | 144 |
| stirr. 2 minutes: $Mg^{++}$ | 14 | 13.5 | 15 | 21.5 |
| granulometry: | | | | |
| <2 μm | 3% | 1% | 3% | 1.5% |
| <3 μm | 14% | 3.5% | 11% | 9% |
| <5 μm | 70% | 37% | 47.5% | 71% |
| <8 μm | 99% | 89% | 94% | 98% |
| <10 μm | 100% | 96.5% | 98.5% | 99% |
| Coarse fraction (α) | 0 | 3.5 | 1.5 | 1 |
| Modulation (ω) | 85 | 85.5 | 83 | 89 |

What is claimed is:

1. A batch process for the synthesis of a zeolite 4A having a coarse fraction equal to zero, an exchange power with $Mg^{++}$ equal to or higher than 45 mg CaO/g, and a granulometric modulation index equal to or higher than 85, wherein, in a first stage, an aqueous solution of Na silicate, in which the $SiO_2:H_2O$ molar ratio is from 0.60 to 0.150 and the $SiO_2/Na_2O$ molar ratio is from 1.95 to 2.30, is added to an aqueous solution of Na aluminate containing an excess of NaOH, preheated at 70°-75° C., and wherein, in a second stage, the thus-obtained mixture is crystallized at 70°-105° C., the global dilution factor, τ, being from 8 to 15, said process being characterized in that the temperature of the silicate solution is at least 20° C. lower than the temperature of the aluminate solution, the crystallization time being at least 50 minutes, whereby said silicate solution can be added within a time equal to or less than 15 minutes without using any Venturi tube or any ultra-rapid stirrer, and wherein the crystallization is subdivided into three sub-stages, the first sub-stage being characterized by the temperature of approximately 70° C., the second sub-stage including a gradual rising of the temperature between the first and third sub-stages of from approximately 70° C. to 95°-105° C., and the third sub-stage being characterized by a temperature of from 95° to 105° C.

2. The process according to claim 1, wherein the time of the first sub-stage is from 30 to 60 minutes, the time of the second sub-stage is from 10 to 80 minutes, and the time of the third sub-stage is from 10 to 90 minutes.

3. A process according to claim 1, wherein the time of the first sub-stage is 40 to 50 minutes, the time of the second sub-stage is 15 to 40 minutes, and the time of the third sub-stage is 15 to 60 minutes.

* * * * *